(12) United States Patent
Matzdorf et al.

(10) Patent No.: US 6,511,532 B2
(45) Date of Patent: *Jan. 28, 2003

(54) POST-TREATMENT FOR ANODIZED ALUMINUM

(75) Inventors: Craig A. Matzdorf, California, MD (US); Michael J. Kane, Callaway, MD (US); James L. Green, III, Lusby, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/012,982

(22) Filed: Nov. 6, 2001

(65) Prior Publication Data

US 2002/0117236 A1 Aug. 29, 2002

Related U.S. Application Data

(63) Continuation-in-part of application No. 09/702,225, filed on Oct. 31, 2000, now Pat. No. 6,375,726.

(51) Int. Cl.[7] .............................................. C23C 22/05
(52) U.S. Cl. ................. 106/14.44; 106/14.21; 106/14.41; 148/247; 148/275
(58) Field of Search ................ 106/14.21, 14.41, 106/14.44; 148/247, 275

(56) References Cited

U.S. PATENT DOCUMENTS

| | | | | |
|---|---|---|---|---|
| 3,539,403 A | * | 11/1970 | Ries ........................... | 148/247 |
| 3,912,548 A | * | 10/1975 | Faigen ....................... | 148/247 |
| 3,986,970 A | * | 10/1976 | Shiga ......................... | 216/107 |
| 4,148,670 A | * | 4/1979 | Kelly ......................... | 148/247 |
| 4,273,592 A | * | 6/1981 | Kelly ......................... | 148/247 |
| 4,339,310 A | * | 7/1982 | Oda et al. ................. | 106/14.12 |
| 4,921,552 A | * | 5/1990 | Sander et al. ............... | 148/247 |
| 4,963,198 A | * | 10/1990 | Higgins ..................... | 148/267 |
| 5,091,023 A | * | 2/1992 | Saeki et al. .............. | 106/14.12 |
| 5,226,976 A | * | 7/1993 | Carlson et al. ........... | 106/14.15 |
| 5,304,257 A | * | 4/1994 | Pearlstein et al. .......... | 148/265 |
| 5,395,655 A | * | 3/1995 | Kazuyuki et al. ........... | 148/251 |
| 6,375,726 B1 | * | 4/2002 | Matzdorf et al. ........ | 106/14.21 |

* cited by examiner

*Primary Examiner*—Anthony J. Green
(74) *Attorney, Agent, or Firm*—Ron Billi

(57) ABSTRACT

Composition for post-treating anodized aluminum and aluminum alloys and the process for using said composition to improve the corrosion-resistance, abrasion, and adhesion bonding properties of the anodized aluminum and its alloys. The composition comprises an acidic aqueous solution having a pH ranging from about 2.5 to 4.5 containing effective amounts of trivalent chromium salts, alkali metal hexafluorozirconates, an alkali metal fluoro-compound e.g. fluoroborates and/or fluorosilicates, and effective amounts of water soluble thickeners and surfactants.

20 Claims, 6 Drawing Sheets

BORIC-SULFURIC ACID ANODIZED 2024-T6 WITH TCP POST TREATMENT
AFTER EXPOSURE TO 1000 HOURS OF ASTM B 117 NEUTRAL SALT FOG

THIN-FILM SULFURIC ACID ANODIZED 2024-T6 WITH TCP POST TREATMENT
AFTER EXPOSURE TO 1000 HOURS OF ASTM B 117 NEUTRAL SALT FOG

BORIC-SULFURIC ACID ANODIZED 2024-T6 WITH CHROMATE POST TREATMENT
AFTER EXPOSURE TO 1000 HOURS OF ASTM B 117 NEUTRAL SALT FOG

THIN-FILM SULFURIC ACID ANODIZED 2024-T6 WITH CHROMATE POST TREATMENT AFTER EXPOSURE TO 1000 HOURS OF ASTM B 117 NEUTRAL SALT FOG

BORIC-SULFURIC ACID ANODIZED 2024-T8 WITH HOT WATER POST TREATMENT AFTER EXPOSURE TO 1000 HOURS OF ASTM B 117 NEUTRAL SALT FOG

THIN-FILM SULFURIC ACID ANODIZED 2024-T6 WITH HOT WATER POST TREATMENT
AFTER EXPOSURE TO 1000 HOURS OF ASTM B 117 NEUTRAL SALT FOG

POST-TREATMENT FOR ANODIZED ALUMINUM

CONTINUATION APPLICATION

This application is a continuation-in-part of application Ser. No. 09/702,225 filed Oct. 31, 2000 by Matzdorf et al., now U.S. Pat. No. 6,375,726 B1 issued Apr. 23, 2002.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to a process of post-treating anodized aluminum(s), and to the composition for treating anodized aluminum(s) to improve adhesion-bonding, abrasion-resistant, and the corrosion-resistant properties. More specifically, this invention relates to a novel composition, and to the process of using the composition to seal or post-treat anodized aluminum and anodized aluminum alloys. The trivalent chromium post-treatment (TCP) composition comprises an acidic aqueous solution containing effective amounts of at least one water-soluble trivalent chromium salt, an alkali metal hexafluorozirconate, at least one alkali metal tetrafluoroborate and/or hexafluorosilicate and effective amounts of water-soluble thickeners and/or water-soluble surfactants.

2. Description Of Prior Art

Anodized aluminum(s) are generally sealed or post-treated after anodizing by processes employing a variety of sealing compositions. Current high-performance post treatments or sealers for anodized aluminum are based on hexavalent chromium chemistry. Hexavalent chromium is highly toxic and a known carcinogen. As a result, the solutions used to deposit these protective coatings and the coating per se are toxic. These films do, however, yield outstanding paint adhesion, abrasion, and corrosion resistance to the anodized aluminum. Typically, seal coatings are deposited onto the anodized coating at elevated temperatures and are usually applied by immersion or spray processes. Post treatments are usually called out by the military or commercial specifications that govern each coating being treated. As such, there is not a unique "post treatment" specification for all anodize aluminums like there is for "conversion coating" aluminums.

Further, environmental laws, executive orders, and local occupational, safety, and health (OSH) regulations are driving military and commercial users in the search for hexavalent chromate-free post treatments. In the case of anodized aluminums, the anodize film and base metal are relatively non-toxic. With the addition of the required hexavalent chromate post treatment, these coatings become toxic. Other post treatments, such as nickel acetate, and various fluoride compounds do not contain chromates, but their technical performance is inferior to the chromate-based coatings. In addition, the use of chromate post treatments is becoming more expensive as regulations tighten. Costs may become prohibitive with future restrictions imposed by the EPA. Thus, while existing chromate post treatments are outstanding in their technical performance in that they provide enhanced corrosion protection and adhesion bonding e.g. paint and other coatings at a low application cost, from a life-cycle cost, environmental, and OSH perspective, hexavalent chromate coatings are detrimental for people and the environment.

SUMMARY OF THE INVENTION

This invention relates to a novel composition and to the process of using said composition to post-treat or seal anodized aluminum and its alloys at ambient temperatures or higher e.g. ranging up to about 200° F. More specifically, this invention relates to a composition for post-treating anodized aluminum and its alloys to improve the corrosion-resistance and adhesion bonding properties e.g. paint adhesion etc. The trivalent chromium post-treatment (TCP) composition comprises an acidic aqueous solution having a pH ranging from about 2.5 to 4.5 and preferably 3.7 to 4.0, and per liter of said solution, from about 0.01 to 22 grams of a water-soluble trivalent chromium salt, about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate and various combinations thereof, from about 0 to 10 grams and preferably 0 to 2.0 grams of at least one water-soluble thickener, and from 0 to 10 and preferably 0 to 10 grams of at least one water-soluble non-ionic, cationic or anionic surfactant.

It is therefore an object of this invention to provide an aqueous solution comprising a trivalent chromium salt, an alkali metal hexafluorozirconate, and a tetrafluoroborate and/or hexafluorosilicate for post-treating, anodized aluminum and its alloys to improve the adhesion bonding, abrasion, and corrosion-resistance characteristics.

It is another object of this invention to provide a stable acidic aqueous solution having a pH ranging from about 2.5 to 4.5 containing a trivalent chromium salt for treating or sealing anodized aluminum and its anodized alloys.

It is a further object of this invention to provide a stable acidic aqueous solution having a pH ranging from about 3.7 to 4.0 containing trivalent chromium for treating or sealing anodized aluminum and its alloys at about room temperature wherein said solution contains substantially no hexavalent chromium.

These and other objects of the invention will become apparent by reference to the detailed description when considered in conjunction with the accompanying FIGS. 1–6(photos).

DETAILED DESCRIPTION OF THE INVENTION

Figure 1:
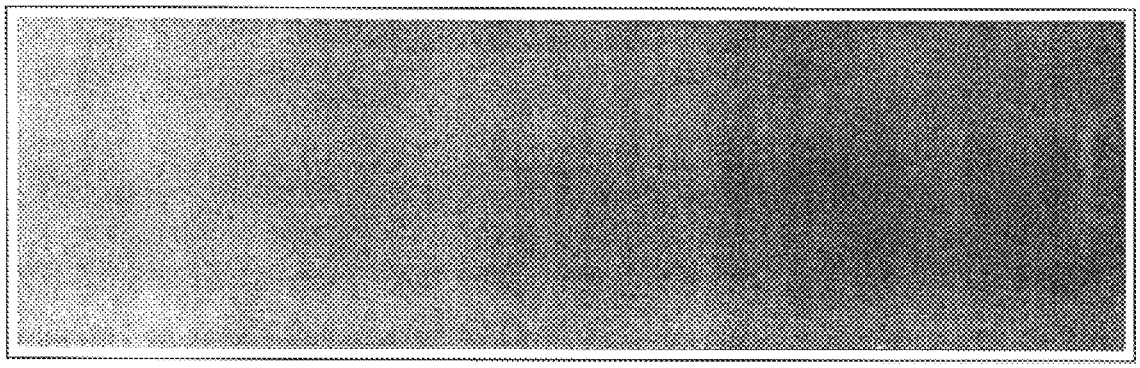
FIG. 1 is a photo of a boric-sulfuric acid anodized 2024-T3 with TCP (trivalent Chromium Post-Treatment) after exposure to 1000 hours of ASTM-B 117 neutral salt fog test.

More specifically, this invention relates an acidic aqueous solution having a pH ranging from about 2.5 to 4.5, and preferably from about 3.7 to 4.0 and to the use of said solution for post-treating or sealing anodized aluminum and its alloys to improve the adhesion bonding and corrosion-resistance properties of the anodized aluminum(s). The novel compositions of this invention comprise, per liter of solution, from about 0.01 to 22 grams and preferably from about 4.0 to 8.0 grams e.g. 6.0 grams of at least one water soluble trivalent chromium salt e.g. chromium sulfate, about 0.01 to 12 grams and preferably about 6 to 10 grams e.g. 8.0 grams of at least one alkali metal hexafluorozirconate, about 0.01 to 12 grams and preferably about 0.12 to 1.2 grams e.g. 0.24 to 0.36 grams of at least one fluoro-compound selected from the group consisting of alkali metal tetrafluoroborates, alkali metal hexafluorosilicates and various mixtures or combinations thereof In some processes, depending on the physical characteristics of the anodized aluminum e.g. the physical size of the anodized substrate, an unique feature is the addition of a thickener to the solution that aids in optimum film formation during spray and wipe-on applications by slowing down solution evaporation. This also mitigates the formation of powdery deposits that degrade paint adhesion. In addition, the addition of thickeners, aids in proper film formation during large area applications and mitigates the diluent effect of rinse water remaining on the substrate during processing from previous steps. This feature yields films that have no streaks and are better in coloration and corrosion protection.

The water-soluble thickeners such as the cellulose compounds are present in;the acidic aqueous solution in amounts ranging from about 0 to 10 grams and preferably from 0 to 2.0 grams and more preferably from 0.5 to 1.5 e.g., about 1.0 gram per liter of the aqueous solution. Depending on the characteristics of the anodized aluminum, an effective but small amount of at least one water-soluble surfactant can be added to the acidic solution in amounts ranging from about 0 to 10 grams and preferably from 0 to 2.0 grams and more preferably from 0.5 to 1.5 grams e.g. 1.0 gram per liter of the acidic solution. These surfactants are known in the prior art and are selected from the group consisting of non-ionic, cationic and anionic surfactants.

The trivalent chromium is added as a water-soluble trivalent chromium compound, preferably as a trivalent chromium salt. Specifically, in formulating the acidic aqueous solutions of this invention, the chromium salt can be added conveniently to the solution in its water soluble form wherein the valence of the chromium is plus 3. The preferred chromium compounds are incorporated in the solution in the form of $Cr_2(SO_4)_3$, $(NH_4)Cr(SO_4)_2$ or $KC_2(SO_4)_2$ and any mixtures of these compounds. The aluminum substrates are either pure anodized aluminum or an anodized aluminum alloy containing over 60% by weight of aluminum. A preferred trivalent chromium concentration is within the range of about 4 to 8 grams or 6.0 grams per liter of the aqueous solution. It has been found that particularly good results are obtained for these processes when the trivalent chromium compound is present in solution in this preferred range. The preferred metal fluorozirconate addition to the solution ranges from about 6 to 10 grams or 8.0 grams per liter of solution.

The post treatment of the anodized aluminum can be carried out at low temperatures including the temperature of the solution e.g. temperatures ranging up to about 200° F. or at ambient temperatures. Room temperature treatment is preferred in that this eliminates the necessity for heating equipment. The coating may be air dried by any of the methods known in the art, for example, oven drying, forced air drying, exposure to infra-red lamps, etc. For purposes of this invention, the terms anodized aluminum and anodized aluminum alloys include aluminum and its alloys anodized by methods known in the art.

The following Examples illustrate the acidic solutions of this invention and the method of using the solutions in post-treating or sealing anodized aluminum and aluminum alloys.

EXAMPLE 1

An acidic aqueous solution having a pH ranging from about 3.7 to 4.0 for post-treating anodized aluminum and aluminum alloys to improve the corrosion-resistant and adhesion bonding comprises from about 6.0 grams of trivalent chromium sulfate per liter of solution, about 8.0 grams of potassium hexafluorozirconate per liter of solution, about 0.01 gram of potassium tetrafluoroborate per liter and about 1.0 gram of a cellulose thickener per liter and about 1.0 gram of a water soluble nonionic surfactant per liter of solution.

EXAMPLE 2

An acidic aqueous solution having a pH of 3.7 to 4.0 for post-treating aluminum and its alloys to improve adhesion bonding and corrosion-resistant which comprises, per liter of solution, from about 0.01 to 22 grams of trivalent chromium sulfate, about 0.01 to 12 grams of potassium hexafluorozirconate, about 0.01 to 12 grams of potassium tetrafluoroborate and from about 0.5 to 1.5 grams of methylcellulose thickener.

EXAMPLE 3

An acidic aqueous solution having a pH ranging from 3.7 to 4.0 for post-treating anodized aluminum and its alloys to improve adhesion bonding and corrosion-resistant which comprises, per liter of solution, from about 4.0 to 8.0 grams of trivalent potassium-chromium sulfate ($KCr(SO_4)_2$), about 6 to 10 grams of potassium hexafluorozirconate about 0.01 to 12 grams of potassium hexafluorosilicate and from about 0.5 to 1.5 grams of methylcellulose thickener.

EXAMPLE 4

A preferred method of preparing the acidic solution comprises mixing about 0.01 to 22 grams per liter of solution of chromium III sulfate and preferably about 6.0 grams per liter with about 0.01 to 12 grams per liter of solution of potassium hexafluorozirconate, preferably about 8.0 grams per liter in distilled or deionized water. The composition is ready to use after a dwell of 24 hours, most preferably after the pH of the solution has risen between 3.7 and 4.0. About 0.1 weight percent of Methocel F4M, or about 1.0 gram per liter is used for optimum performance. The addition of potassium tetrafluoroborate and/or potassium hexafluorosilicate ranges from 0.01 grams per liter up to their solubility limit. Preferably, the addition is about 50% by weight of the fluorosilicate based on the weight of fluorozirconate. About 1.0 to 10 weight percent of the fluoroborate salt is added based on the amount of the flurozirconate salt. More preferably, about 3.0 weight percent of potassium tetrafluoroborate is added to the solution based on the amount of the fluorozirconate in solution.

In the process of this invention, the above solutions may be stabilized by the manipulation of pH. For example, a freshly made solution of about 8.0 grams per liter of potassium hexafluorozirconate and 6.0 grams per liter of chromium III sulfate, was added to a dilute sulfuric acid to lower the pH to about 3.0. After about 1 week the pH rises to about 3.6 where it stabilizes without further chemical manipulation. The pH can be adjusted with acid or base additions to keep the composition in an optimum pH range for the coating deposition.

For purposes of this invention, the post-treatment coatings were applied to anodized aluminum substrates as follows. Thre types of standard anodize processes were used. All types are specified by MIL-A-8625F. Their common names are "Type II sulfuric acid anodize," "boric-sulfuric acid anodize," and "thin-film sulfuric acid anodize.". The type II anodize process is commonly used on a variety of aerospace and other substrates where fatigue performance is not critical. The thin-film sulfuric and boric-sulfuric processes are used as alternatives to chromic acid anodizing. These anodize methods provide thinner films and are used especially where fatigue performance of the aluminum substrate is important.

For optimum corrosion resistance all anodized aluminum coatings require a post-treatment or sealer that is typically based on hexavalent chromium for optimum performance. In addition, these post-treatments are typically applied as solutions at elevated temperatures, approaching the boiling point of water to properly form the desired coating. For example, immediately after anodizing 3" by 10" by 0.32" aluminum panels of 2024-T3 aluminum alloys in the thin-film sulfuric and boric-sulfuric acid anodize described above, the panels were rinsed thoroughly two times in deionized water. Immediately after rinsing, the panels were immersed into a 6-month old 9-gallon solution as shown in Example 4 for about 20 minutes at ambient conditions. The immersion was immediately followed by two deionized water rinses. The panels were air-dried at ambient conditions before being subjected to 1000 hours of neutral salt fog per ASTM B 117. The coupons were held in a rack at 15 degrees for the duration of the test. These panels were tested alongside "controls" that consisted of a similarly-anodized aluminum that was post treated either by immersing in a 200° F. solution of potassium dichromate for 20 minutes or immersing in a 200° F. boiling water solution for 20 minutes.

Figure 2:
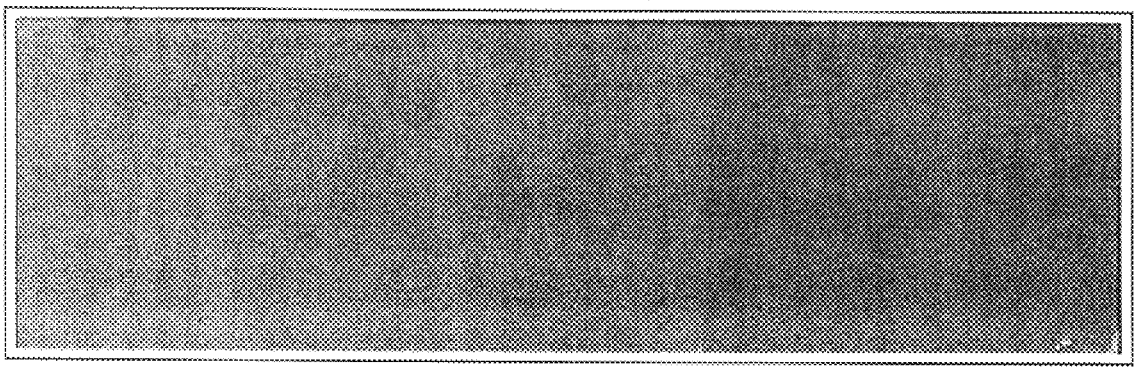
FIG. 2 is a photo of a thin-film sulfuric acid anodized 2024-T3 with TCP post-treatment after exposure to 1000 hours of ASTM-B 117 neutral salt fog test.
Figure 3:
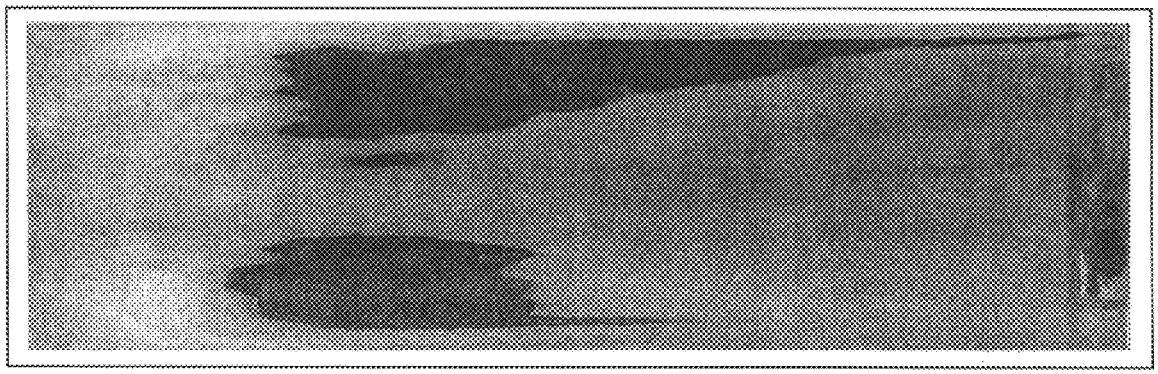
FIG. 3 is a photo of a boric-sulfuric acid anodized 2024-T3 with chromate post-treatment, after exposure to 1000 hours of ASTM-B117 neutral salt fog test.
Figure 4:
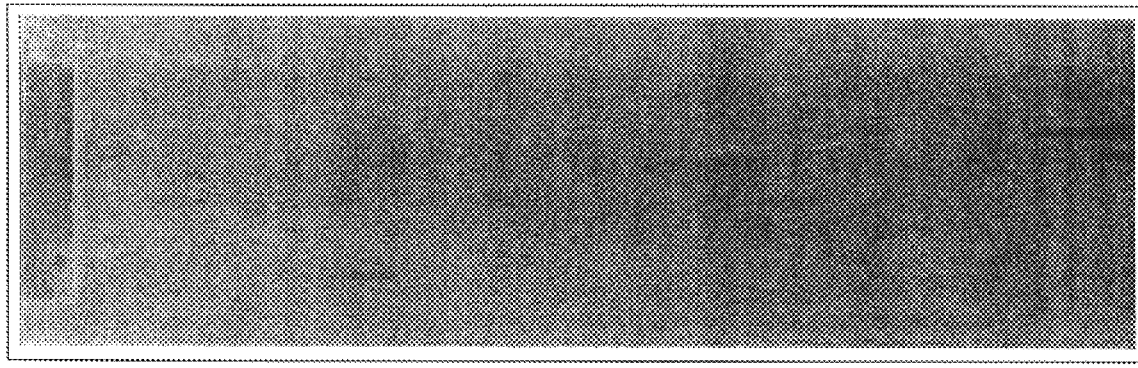
FIG. 4 is a photo of a thin-film sulfuric acid anodized 2024-T3 with chromate post-treatment after exposure to 1000 hours of ASTM-B117 neutral salt fog test.
Figure 5:
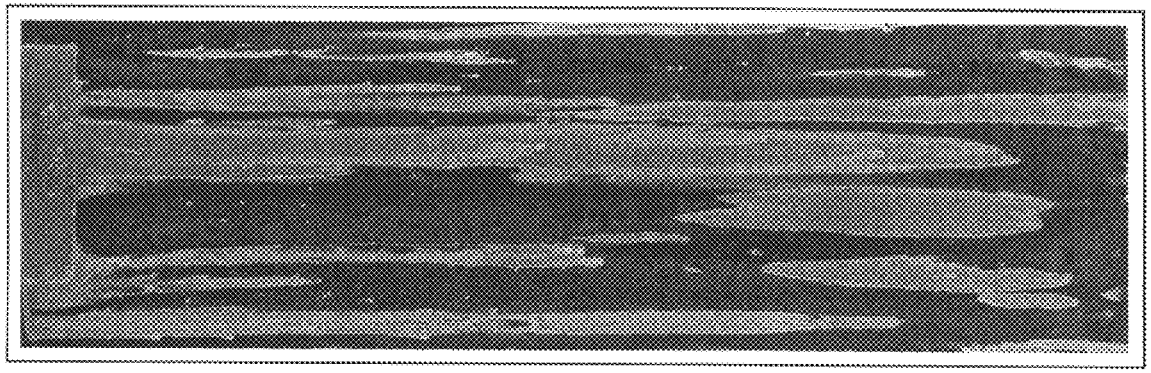
FIG. 5 is a photo of a boric sulfuric acid anodized 2024-T3 with hot water post-treatment after exposure to 1000 hours of ASTM-B 117 neutral salt fog test.
Figure 6:
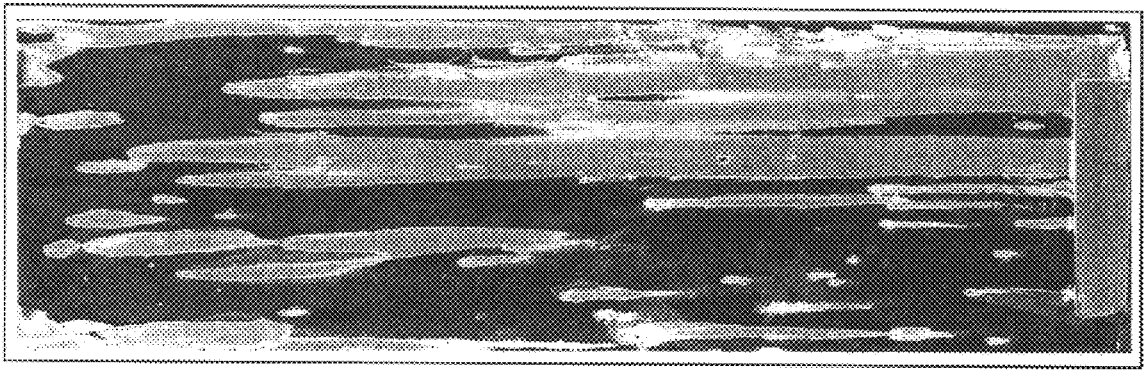
FIG. 6 is a photo of a thin-film sulfuric acid anodized 2024-T3 with hot water post treatment after exposure to 1000 hours of ASTM-B117 neutral salt fog test.

The data in Tables I, II, m and IV and the photos (FIGS. 1–6) show the performance of the post-treatments: (1) the (TCP) trivalent chromate post-treatment of this invention (2) dilute chromate, (3) hot water post-treatment, and (4) TCP with hot water after exposing the panels to 1000 hours of ASTM B 117 neutral salt fog. As shown in the Tables and the photos, the TCP post-treatment of this invention provided superior corrosion resistance, and retained the original iridescence that the coatings had prior to the salt fog test. The test specimens were prepared per Example 4, using 2024-T3 and 7076-T6 aluminums. In addition, the fourth post-treatment was prepared as follows: This post treatment was applied by immersing the anodized aluminum in a TCP solution prepared as in Example 4. After the TCP immersion, the panels were immersed in 2000° F. deionized water for 20 minutes. Instead of testing these coatings for corrosion performance, the resistance of the coatings to acid was determined. The acid dissolution test was carried out by weighing each panel, immersing in a hot stripping solution of chromic acid and phosphoric acid per MIL-A-8625F, rinsing thoroughly in deionized water, and air drying at ambient conditions. After drying, the panels were re-weighed. The recorded weight loss demonstrates the ability of various post treatments to resist the corrosive acidic environment of the stripping solution.

Table 1 shows the average weight loss of three different panels for each post treatment and anodize coating combination. The TCP post-treated and TCP hot water post-treated systems show better performance (less coating weight lost) than the dilute chromate and hot water post-treatment controls. Similar results were observed for coating systems on 2024-T3 and 7075-T6 aluminums.

TABLE I

| Anodize Aluminum | Post Treatment | Average Coating Weight Lost |
|---|---|---|
| Boric-Sulfuric | Dilute chromate | 392 mg/sq. ft. |
| | Hot water seal | 176 |
| | TCP (trivalent chromate post treatment) | 85 |
| | TCP plus hot water seal | 6 |
| Thin-Film Sulfuric | Dilute chromate | 365 |
| | Hot water seal | 130 |
| | TCP | 59 |
| | TCP plus hot water | 2 |
| Sulfuric | Dilute chromate | 664 |
| | Hot water seal | 335 |
| | TCP | 340 |
| | TCP plus hot water seal | 15 |

The 1000 hour Neutral Salt Fog Exposure of various anodized aluminums with various post-treatments is shown in Tables II, m and IV. The corrosion ratings (ASTM DI 654) are given with 10 representing no corrosion and 0 fully corroded. The corrosion ratings can be seen in the photos, FIGS. 1–6.

TABLE II

| Anodize Type | Aluminum Alloy | Post Treatment | Results |
|---|---|---|---|
| Boric-Sulfuric (Type IC) | 2024-T3 | none | 0 |
| | | none | 0 |
| | | dilute chromate | 4 |
| | | hot water | 1 |
| | | TCP (20 min. immersion) | 10 |
| | | TCP 20 min. + hot water | 10 |
| | 7075-T6 | none | 0 |
| | | none | 0 |
| | | dilute chromate | 7 |
| | | hot water | 6 |
| | | TCP (20 min. immersion) | 10 |
| | | TCP 20 min. + hot water | 10 |

TABLE III

| Anodize Type | Aluminum Alloy | Post Treatment | Results |
|---|---|---|---|
| Thin Film sulfuric (Type IIB) | 2024-T3 | none | 0 |
| | | none | 0 |
| | | dilute chromate | 9 |
| | | dilute chromate | 9 |
| | | hot water | 1 |
| | | hot water | 1 |
| | | TCP (20 min. immersion) | 9 |
| | | TCP (20 min. immersion) | 9 |
| | | TCP 20 min. + hot water | 10 |
| | | TCP 20 min. + hot water | 9 |
| | 7075-T6 | none | 0 |
| | | none | 0 |
| | | dilute chromate | 10 |

TABLE III-continued

| Anodize Type | Aluminum Alloy | Post Treatment | Results |
|---|---|---|---|
| | | dilute chromate | 10 |
| | | hot water | 5 |
| | | hot water | 8 |
| | | TCP (20 min. immersion) | 10 |
| | | TCP (20 min. immersion) | 10 |
| | | TCP 20 min. + hot water | 10 |
| | | TCP 20 min. + hot water | 10 |

TABLE IV

| Anodize Type | Aluminum Alloy | Post Treatment | Results |
|---|---|---|---|
| Sulfuric (Type II) | 2024-T3 | none | 1 |
| | | none | 1 |
| | | dilute chromate | 9 |
| | | dilute chromate | 10 |
| | | hot water | 4 |
| | | hot water | 4 |
| | | TCP (20 min immersion) | 9 |
| | | TCP (20 min. immersion) | 9 |
| | | TCP 20 min. + hot water | 9 |
| | | TCP 20 min. + hot water | 9 |
| | 7075-T6 | none | 0 |
| | | none | 0 |
| | | dilute chromate | 9 |
| | | dilute chromate | 10 |
| | | hot water | 9 |
| | | hot water | 9 |
| | | TCP (20 min. immersion) | 10 |
| | | TCP (20 min. immersion) | 9 |
| | | TCP 20 min. + hot water | 10 |
| | | TCP 20 min. + hot water | 10 |

For purposes of this invention, the water soluble surfactants can be used in effective amounts ranging from about 0 to 10 grams per liter, preferably from 0.0 to about 2.0 grams per liter and more preferably about 0.5 to 1.5 grams per liter of the post treatment solutions. The surfactants are added to the aqueous solutions to provide better wetting properties by lowering the surface tension thereby insuring complete coverage and a more uniform coating on the anodized aluminum substrate. The surfactants include at least one water soluble compound selected from the group consisting of the non-ionic, anionic, and cationic surfactants. Some of the known water soluble surfactants include the monocarboxyl imidoazoline, alkyl sulfate sodium salts (DUPONOL®), tridecyloxy poly(alkyleneoxy ethanol), ethoxylated or propoxylated alkyl phenol (IGEPAL®), alkyl sulfoamides, alkaryl sulfonates, palmitic alkanol amides (CENTROL®), octylphenyl polyethoxy ethanol (TRITON®), sorbitan monopalmitate (SPAN®), dodecylphenyl polyethylene glycol ether (e.g. TERGITROL®), alkyl pyrrolidone, polyalkoxylated fatty acid esters, alkylbenzene sulfonates and mixtures thereof Other known water soluble surfactants are disclosed by "Surfactants and Detersive Systems", published by John Wiley & Sons in Kirk-Othmer's Encyclopedia of Chemical Technology, 3$^{rd}$ Ed.

When large anodized aluminum surfaces or substrates do not permit immersion or where vertical surfaces are to be sprayed, thickening agents are used to retain the aqueous solutions on the surface for sufficient contact time. The thickeners employed are known water soluble thickeners which can be added to the trivalent chromium solutions of this invention in effective amounts ranging from about 0 to 10 grams per liter and preferably from 0.0 about 2.0 grams per liter and more preferably from about 0.5 to 1.5 grams per liter of the acidic solution. Specific examples of these additives particularly include the cellulose thickeners e.g. hydroxypropyl cellulose (e.g. Klucel), ethyl cellulose, hydroxyethyl cellulose, hydroxymethyl cellulose,: methyl cellulose, and some of the water soluble inorganic thickeners such as colloidal silica, clays such as bentonite, starches, gum arabic, tragacanth, agar and any combination thereof.

While this invention has been described by a number of specific examples, it is obvious that there are other variations and modifications which can be made without departing from the spirit and scope of the invention: as particularly set forth in the appended claims.

The invention claimed:

1. A process for post-treating anodized aluminum and anodized aluminum alloys to improve the corrosion-resistance, abrasion, and adhesion bonding properties which comprises sealing the anodized aluminum and anodized aluminum alloys with an acidic aqueous solution having a pH ranging from about 2.5 to 4.5 comprising, per liter of said solution, from about 0.01 to 22 grams of a water soluble trivalent chromium salt, about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate and mixtures thereof, from 0 to 10 grams of at least one water soluble thickener and 0 to 10 grams of at least one water soluble surfactant.

2. The process of claim 1 wherein the pH of the aqueous solution ranges from about 3.7 to 4.0 and the temperature of the aqueous solution ranges from about room temperature.

3. The process of claim 2 wherein the trivalent chromium salt ranges from about 4 to 6 grams, the hexaflurozirconate ranges from about 6 to 10 grams, and the fluoro-compound ranges from about 0.12 to about 1.2 grams.

4. The process of claim 3 wherein the thickener ranges from about 0.5 to about 1.5 grams.

5. The process of claim 4 wherein the surfactant ranges from about 0.5 to 1.5 grams.

6. A process for post-treating anodized aluminum and anodized aluminum alloys to improve the corrosion-resistance, abrasion, and adhesion bonding properties which comprises treating the anodized aluminum and anodized aluminum alloys with an aqueous solution having a pH ranging from about 3.7 to 4.0 which comprises, per liter of solution, from about 4.0 to 8.0 grams of a water soluble trivalent chromium salt, about 6.0 to 10 grams of an alkali metal hexafluorozirconate, and about 0.12 to 1.2 grams of at least one fluoro-compound selected from the group consisting of an alkali metal tetrafluoroborate, an alkali metal hexafluorosilicate, and mixtures thereof.

7. The process of claim 6 wherein the fluoro-compound is present in the solution in an amount ranging from about 0.24 to 0.36 grams and the post-treated anodized aluminum is subsequently treated with hot water at temperatures ranging up to 200° F.

8. The process of claim 6 wherein about 0.5 to 1.5 grams of a cellulose thickener is present in the acidic chromate solution.

9. The process of claim 6 wherein the chromium salt is trivalent chromium sulfate.

10. The process of claim 6 wherein the alkali metal zirconate is potassium hexafluorozirconate.

11. A composition for post-treating anodized aluminum and anodized aluminum alloys to improve the corrosion-resistance, abrasion, and abrasion bonding properties which comprises an acidic aqueous solution having a pH ranging from about 2.5 to 4.5, and per liter of said solution, from about 0.01 to 22 grams of a water-soluble trivalent chromium salt, about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate, and mixtures thereof, from 0 to 10 grams of at least one water soluble thickener and from 0 to 10 grams of at least one water soluble surfactant.

12. The composition of claim 11 wherein the pH of the aqueous solution ranges from about 3.7 to 4.0.

13. The composition of claim 12 wherein the trivalent chromium salt ranges from about the 4.0 to 8.0 grams, the hexofluorozirconate ranges from about 6.0 to 10 grams, and the fluoro-compound ranges from about 0.12 to 1.2 grams.

14. The composition of claim 13 wherein the thickener ranges from about 0.5 to 1.5 grams.

15. The composition of claim 14 wherein the surfactant ranges from about 0.5 to 1.5 grams.

16. A composition for seal coating anodized aluminum and anodized aluminum alloys to improve the corrosion-resistance, abrasion, and adhesion bonding properties which comprises an acidic aqueous solution having a pH ranging from about 3.7 to 4.0, and per liter of said solution, from about 0.01 to 22 grams of a water soluble trivalent chromium salt, about 0.01 to 12 grams of an alkali metal hexafluorozirconate, about 0.01 to 12 grams of at least one fluoro-compound selected from the group consisting of an alkali metal tetrafluoroborate, an alkali metal hexafluorosilicate and mixtures thereof, from 0 to 2.0 grams of at least one water soluble thickener and from 0 to 2.0 grams of at least one water soluble surfactant.

17. The composition of claim 16 wherein the tetrafluoroborate is present in the chromate solution in an amount ranging from about 0.24 to 0.36 grams per liter.

18. The composition of claim 16 wherein about 0.5 to 1.5 grams of a cellulose thickener is present in the chromate solution.

19. The composition of claim 16 wherein the chromium salt is trivalent chromium sulfate.

20. The composition of claim 16 wherein the alkali metal zirconate is a potassium hexafluorozirconate.

* * * * *